United States Patent [19]

Anscher

[11] 4,371,137

[45] Feb. 1, 1983

[54] WIRE BUNDLE CLAMP

[76] Inventor: Bernard Anscher, 21 Elm St., Woodbury, N.Y. 11797

[21] Appl. No.: 247,838

[22] Filed: Mar. 26, 1981

[51] Int. Cl.³ .............................................. F16L 3/08
[52] U.S. Cl. .................................. 248/73; 24/16 PB; 248/74 PB
[58] Field of Search ................... 248/68 R, 73, 74 R, 248/74 A, 74 B, 74 PB; 24/16 PB

[56] References Cited

U.S. PATENT DOCUMENTS

| | | | |
|---|---|---|---|
| 3,088,702 | 5/1963 | Orenick et al. | 248/74 PB |
| 3,161,210 | 12/1964 | Loof | 248/74 PB |
| 3,516,631 | 6/1970 | Santucci | 248/74 PB |
| 3,543,353 | 12/1970 | Meehan | 24/16 PB |
| 3,909,883 | 10/1975 | Fegen | 174/138 D |
| 3,910,536 | 10/1975 | Sharp | 248/68 R |
| 4,220,301 | 9/1980 | Jacobs et al. | 248/74 PB |
| 4,268,559 | 5/1981 | Smuckler | 24/16 PB X |

FOREIGN PATENT DOCUMENTS

| | | | |
|---|---|---|---|
| 1573303 | 5/1969 | France | 24/16 PB |
| 2279010 | 2/1976 | France | 248/74 PB |
| 327839 | 2/1958 | Switzerland | 24/16 PB |

*Primary Examiner*—J. Franklin Foss
*Attorney, Agent, or Firm*—Kenyon & Kenyon

[57] ABSTRACT

A snap-locking wire bundle clamp for securing axially aligned wires, lines and cords comprising a flexible band in the configuration of an open loop having a resilient cylindrical projection on one of its ends and a complementary resilient cylindrical hole on its opposite end. The cylindrical projection and hole are aligned and adapted on the flexible band so that a pinching action imposed on the band ends will move them into engagement, locking the device. In an adjustable embodiment of the invention the ends of the flexible band overlap and the cylindrical projection and multiple cylindrical holes are disposed on opposite confronting surfaces of the overlapping band ends. With this adjustable wire bundle clamp, wire bundles of different sizes may be snugly secured by a pinching action deployed on the band ends to drive the cylindrical projection into engagement with a cylindrical hole which defines with the projection an operative band length corresponding to an enclosure of the approximate size of the wire bundle to be secured.

11 Claims, 8 Drawing Figures

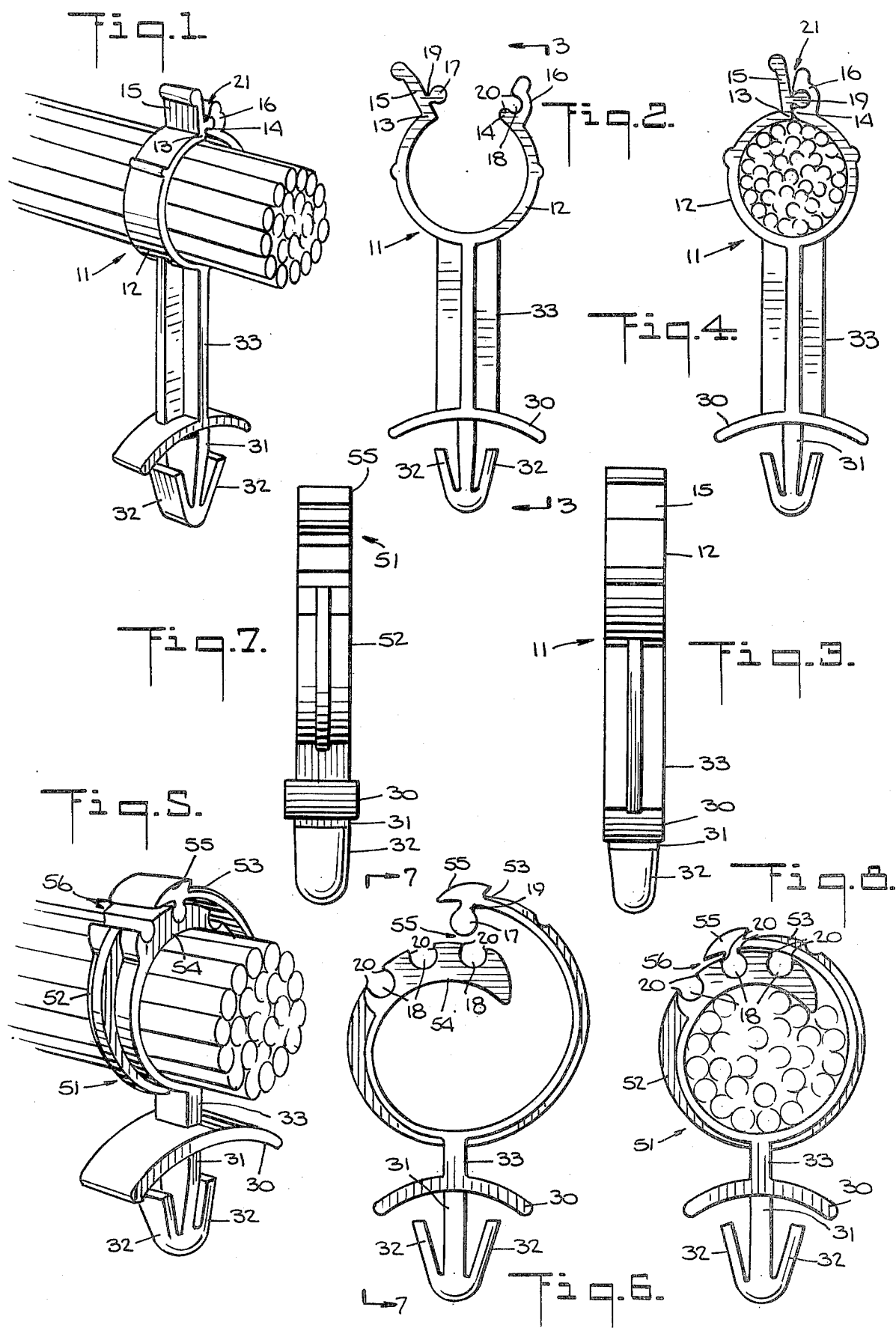

WIRE BUNDLE CLAMP

BACKGROUND TO INVENTION

This invention relates to convenient-to-use, yet sure, wire bundle clamps for securing axially aligned workpieces such as wires, lines, cables, cords or the like; more particularly the invention relates to snap-locking wire bundle clamps which can be opened and closed without damaging any workpieces contained therein, using only the fingers of one hand.

Wire bundle clamps for the securing of wires, lines, cables, cords and the like have generally fallen into one or two groups, those which merely secure a number of such workpieces together in a bundle and those performing the aforesaid function, which additionally incorporate a device for affixing the wire bundle clamp to another object. The present invention is directed to improved wire bundle clamps which can be employed either by themselves to secure workpieces together or in conjunction with an affixing device to hold the wire bundle clamp and its content to a fixed position. Such affixing devices are well-known in the art, and any of them should be suitable for use with the present invention. Typical of these devices is one which can be attached to or integral with a part, consisting of a stem bearing resilient wing-like projections, orientated on the stem so as to fold in against it while the stem is being inserted into a wall aperture and to expand behind the wall once fully inserted, thereby preventing removal. Other affixing devices range from simple clips to adhesives.

Devices previously used to bundle wires, lines, cables, cords and the like have taken several forms. One such device is shown in U.S. Pat. No. 3,543,353. This device consists of an open plastic ring, the ends of which from the point of would be closure take on a curvature opposite that of the ring, terminating finally with ball-like projections. To employ this "wire tie" device one must slide the tie around the lines to be bundled and twist the ends of the ring about each other until they are encoiled in an embrace retained by the engagement of their ball-like projections. Another known device, which also incorporates an affixing means, consists of an open circular band, the ends of which are equipped with confronting clasp members which have retaining ledges on their oppositely orientated faces. Locking a wire bundle clamp of this type requires that the clasp members, which project perpendicularly from the band ends, be twisted about one another until the retaining ledges are brought into overlapping engagement.

Each of these previously know wire bundle clamps can be characterized as requiring a twisting motion to engage the device's lock. Two hands are usually needed for the installation of these clamps, since twisting motions of the type required typically result in the rotation of the entire wire bundle clamp if the workpiece bundle securing portion of the clamp is not restrained from motion relative to the lock or clasp mechanism. This requirement of the previously known wire bundle clamps has presented a serious obstacle to their use in certain applications.

Among the most common application for wire bundle clamps is the securing of wires, lines and cables in the typically tight quarters of electric equipment chassis. In many such uses the very congestion and low clearances which called for the application of a wire bundle clamp has served to prevent an installer from using two hands to lock the device, this has often resulted in "twist locking" clamps being used in the self-defeating unlocked position or even being omitted entirely. Additionally when wire bundle clamps which require a twisting motion for closure are used, should one hand installation be attempted any twisting motion applied to the clasp mechanism is transmitted to the clamp itself, thereby causing it to rotate until the workpieces enclosed therein engage the clamp and halt its rotation. In such a case, where the enclosed workpieces or the components to which they are connected are of delicate construction, they may be broken, abraided or otherwise damaged. Similar damage has also been done by repairers and installers who have attempted to reopen locked wire bundle clamps of the twist type in attempts to insert additional workpieces or remove ones already in service.

Accordingly, it is an object of the present invention to provide an improved wire bundle clamp which can be locked easily using the fingers of one hand, the locking of which does not necessitate a twisting motion, and which when locked will securely hold any workpieces enclosed therein.

Another object of the present invention is to provide a wire bundle clamp which may be easily opened from the locked position with a single hand.

A further object of the present invention is to provide an adjustable wire bundle clamp which can be used to snugly hold workpiece bundles of varying sizes.

A further object of the present invention is to make a wire bundle clamp which can be of an inexpensive, unitary, molded manufacture, utilizing widely available plastic materials such as nylon.

A still further object of the present invention is to make a wire bundle clamp which may be equipped with a device for affixing the clamp and its contents to a given object.

SUMMARY OF THE INVENTION

To accomplish the objects of this invention a wire bundle clamp is constructed from a band of resilient material, having complementary component members of a snap-locking mechanism on each of its ends. In the non-adjustable embodiment of the invention the flexible band has a natural curvature which serves to place the snap-locking mechanism members in juxtaposed alignment establishing between them an annular opening for the insertion of workpieces into the enclosure defined by the flexible band. With a wire bundle clamp of the described design, it is possible to conveniently slip any wires, lines, cords or the like to be bound together through the annular opening of the unlocked device. Once loaded, the device may be locked around its contents merely by pinching together the portions of the clamp adjacent to the annular opening, the pinching action serving to drive the complementary component members of the snap-lock mechanism along arcuate paths defined by the curvature of the flexible band and adapted to bring them into locking engagement. Accordingly, unlike the prior art devices, the installation of a wire bundle clamp of the invention can be accomplished with a single hand, without subjecting the contents of the clamp to any stress.

A snap-locking mechanism found to be particularly suited for use in the invention and to have surprisingly great resistance to unlocking forces is constructed from complementary members consisting of a cylindrical key-like projection and a cylindrical hole of a slightly larger diameter than the cylindrical projection and in axial alignment therewith, the cylindrical hole having an annular opening orientated to receive the key-like projection. The annular opening to the cylindrical hole has a width slightly smaller than the diameter of the key-like projection and at least one and preferably both of the snap-lock component members should be of a resilient construction or material so that, on closing, the key-like projection and the sides of the annular hole opening will undergo deformation to permit the passage of the key-like projection into the cylindrical hole. On locking, the resilient return of the deformed component members of the snap-locking mechanism after the broadest cross-section of the key-like projection has crossed the plane of the annular hole opening causes a snap-locking sound which provides an audible assurance that the device has been locked. By a further teaching of this invention the snap-locking mechanism may substitute a spherical projection and hole for their cylindrical counterparts in the previously described mechanism and a circular opening for the annular one there employed.

A number of wire bundle clamp applications demand a clamp which can snugly hold workpiece bundles of a variety of sizes. In response to this need an adjustable wire bundle clamp according to the invention is provided. In this embodiment of the invention, the flexible band which defines the wire bundle clamp enclosure has a natural curvature such that one end of the band overlaps the other end of the band. In their unlocked orientation the band ends are separated each from the other by a distance commensurate with the size of the workpieces intended for insertion through the arcuate slot defined by the overlapping band ends. While the operation and construction of the snap-locking mechanism members in this embodiment of the invention are the same as in the previously described non-adjustable embodiment, the placement of the cooperating component members must be adapted to provide for an enclosure which is adjustable in size. Accordingly, a single male snap-locking component member, such as the previously described cylindrical projection, is disposed on one of the confronting surfaces of the overlapping band portions and a multiple of female snap-locking mechanism members are disposed on the opposite confronting surface. The female snap-locking component members are positioned along the flexible band so as to define with the single male member operative band lengths corresponding to different workpiece bundle sizes and are disposed on the flexible band in essentially the same plane so that regardless which female snap-lock member is selected for use with the male snap-lock member, the other unused female snap-lock members will not present an obstacle to the engagement of the snap-lock. Thus, the male and a female cooperating component members defining therebetween a band length corresponding to a desired bundle size can be brought into juxtaposed closing alignment by a pinching action deployed to move the overlapping band surfaces laterally one with respect to the other, whereupon the snap-locking mechanism can be driven into engagement by pushing or pinching the overlapping band surfaces together. It should thus be apparent that the application of an adjustable wire bundle clamp according to the invention can also be accomplished with a single hand, without subjecting the contents of the clamp to any potentially damaging forces.

Both the non-adjustable and the adjustable wire bundle clamp of the present invention may be easily opened from the locked position by either pulling the flexible band ends apart or by prying apart the flexible band surfaces adjacent to the snap-locking mechanism which actions disengage one complementary member of that mechanism from the other.

Where it is considered desirable to fasten a wire bundle to a particular location, wire bundle clamps according to the present invention lend themselves to use with devices for fastening the clamp and its contents to another object, such as the widely used wall aperture mounting device of a stem with wings biased to fold in against the stem or insertion through a wall aperture and to then expand behind the wall to prevent removal. Fastening devices of this and other types are preferably attached to the wire bundle clamp on a middle portion of the flexible band so as not to interfere with the movement of the flexible band ends during locking and unlocking.

BRIEF DESCRIPTION OF THE DRAWINGS

The invention, as well as its objects and features will be better understood by reference to the following detailed description of the preferred embodiment of this invention taken in conjunction with the accompanying drawings in which:

FIG. 1 is a perspective view of a wire bundle clamp according to the present invention, locked about a bundle of wires;

FIG. 2 is a side plan view of the wire bundle clamp of FIG. 1, in its unlocked state and without a wire bundle;

FIG. 3 is an end view of the wire bundle clamp of FIG. 2, taken on line 3—3 thereof;

FIG. 4 is a side plan view of the locked wire bundle clamp of FIG. 1;

FIG. 5 is a perspective view of an adjustable wire bundle clamp according to the present invention, locked about a bundle of wires;

FIG. 6 is a side plan view of the wire bundle clamp of FIG. 5, in its unlocked state and without a wire bundle;

FIG. 7 is an end view of the wire bundle clamp of FIG. 6, taken on line 7—7 thereof;

FIG. 8 is a side plan view of the locked wire bundle clamp of FIG. 5.

DETAILED DESCRIPTION OF THE INVENTION

Referring to the drawings wherein like parts are designated by the same number in all of the various figures, a wire bundle clamp 11 incorporating the features of the present invention is shown in FIGS. 1-4 and a wire bundle clamp 51 incorporating the features of the present invention in an adjustable embodiment is shown in FIGS. 5-8. All of the embodiments of the invention may be constructed of any flexible material such as, for example, nylon, acetal, polyester, polycarbonate, polyethylene, polypropylene, ABS, aluminum or steel. Preferably for most applications and from a point of view of cost, wire bundle clamps of the present invention are made as unitary pieces by injection molding from plastic dielectric insulating materials, which for example, may be any of the plastics previously recited; the construction and operation of injection molds being known to those skilled in the art of plastic manufacturing. Wire bundle clamps according to the present invention may also be formed by a number of other plastic molding techniques, such as, for example, casting and compression molding which are similarly familiar to persons skilled in the art. Where metal is choosen as the material of construction for a wire bundle clamp according to the invention, those skilled in that art will recognize die casting as a preferred method of fabrication. Regardless of the method of manufacture, it is viewed as greatly preferable to produce the various embodiments of the present invention as unitary pieces, however, the elements of this invention may also be separately manufactured and assembled into a complete device by adhesives or by mechanical means which will be obvious to those knowledgeable in the art of the material of fabrication.

Wire bundle clamp 11 includes a flexible band 12 having a natural curvature serving to place flexible band ends 13 and 14 in close proximity to one another, with the gap defined therebetween serving as an annular opening for the insertion of axially aligned workpieces into the enclosure defined by the flexible band. The length and curvature of flexible band 12 are adapted to provide an enclosure of suitable size and configuration to contain the wires, lines, cables, cords or the like, intended for insertion therein. While the drawings depicting the invention display bands having generally circular configurations, the present invention may utilize a band having the shape of any closed geometric figure, including for example, oblongs and rectilinears. Thus any band configuration which would be a closed loop, but for a gap between the band ends, is deemed to be within the scope of this invention. The gap between the flexible band ends 13 and 14 is adapted to permit the insertion of the largest of the workpieces intended to be confined in wire bundle clamp 11.

Extending from flexible band ends 13 and 14 are, respectively, finger-grip tabs 15 and 16, extending radially outward with respect to the flexible band enclosure and serving as convenient points of application for closing and locking forces to the wire bundle clamp 11. Disposed, respectively, on finger-grip tabs 15 and 16 are cylindrical projection 17 and cylindrical hole 18, the complementary members of the snap-locking mechanism used to secure workpieces into wire bundle clamp 11. In the depicted embodiment, cylindrical projection 17 appends from finger-grip tab 15 on extension member 19 which in addition to simplifying manufacture by the preferred method of injection molding, increases the clearance between the band ends 13 and 14 when wire bundle clamp 11 is locked, thereby serving to prevent them from becoming obstacles to the engagement of snap-locking members 17 and 18. Cylindrical hole 18 is sized to receive cylindrical projection 17 and is in axial alignment therewith and is disposed within the mass of resilient material which comprises finger-grip tab 16.

Annular opening 20, on the surface of finger-grip tab 16 which confronts cylindrical projection 17, opens cylindrical hole 18 to receive cylindrical projection 17. Annular opening 20 has a width slightly smaller than the diameter of cylindrical projection 17 so that on locking the sides of annular opening 20 and cylindrical projection 17 undergo a resilient deformation, as cylindrical projection 17 passes into cylindrical hole 18. The size of annular opening 20, relative to the diameter of cylindrical projection 17, is adapted so as to provide a snap-locking mechanism with the desired resistance to opening and closing forces. On locking, after the broadest cross-section of projection 17 has crossed the plane of the annular opening 20 the deformed members of the snap-locking mechanism resiliently return to their natural configuration, removably locking cylindrical projection 17 into cylindrical hole 18 and therewith sealing the enclosure defined by flexible band 12.

In alternate embodiments of the invention, the complementary snap-locking members 17 and 18 can also be located at the flexible band ends 13 and 14 or on inwardly orientated radial extensions from the flexible band.

In operation, as a closing force of a magnitude sufficient to overcome the spring-like resilience of flexible band 12 is applied to finger-grip tabs 15 and 16, flexible band 12 resiliently yields to that force, and snap-locking mechanism members 17 and 18 are driven on their respective flexible band ends along arcuate paths adapted to bring cylindrical projection 17 into engagement with cylindrical hole 18. Specifically, responsive to the application of a closing force, most easily applied as a pinching action to finger-grip tabs 15 and 16, snap-locking mechanism members 17 and 18 first move to positions of touching engagement, from which position the application of a sufficient force will cause cylindrical projection 17 and the sides of annular opening 20 to undergo resilient deformation allowing cylindrical projection 17 to pass into cylindrical hole 18, whereupon the deformed components resiliently return to their normal configuration removably locking cylindrical projection 17 into cylindrical hole 18. By a further teaching of the invention the resistance of the snap-lock mechanism may be enhanced by mounting its members 17 and 18 at a slightly outward angle on flexible finger-grip tabs, so that an inward torque must be applied to them through said finger-grip tabs in order to engage the snap-lock. When the finger-grip tabs are released, snap-lock members 17 and 18 cock slightly with respect to each other and more securely hold together.

Referring now to FIG. 3, it is depicted that finger-grip tabs 15 and 16 are aligned so as to create between them, when wire bundle clamp 11 is locked, a slot 21 which extends to snap-locking members 17 and 18. A disengaging force may be brought to bear upon snap-lock members 17 and 18 by inserting into slot 21 an object having a width greater than that existing between finger-grip tabs 15 and 16 when wire bundle clamp 11 is locked. Similarly, it is possible to bring a disengaging force to bear upon the snap-lock mechanism of a locked wire bundle clamp by inserting an object between finger-grip tabs 15 and 16 and then changing its orientation as by inclining it relative to one of those members or by rotating it between them. In the depicted preferred embodiment of the invention, finger-grip tabs 15 and 16 are aligned so as to create a slot 21 of a size particularly suited for use of a finger-nail or screw-driver tip for effecting the opening of locked wire bundle clamp 11.

Wire bundle clamp 11 includes a device for affixing the clamp to supporting wall panels having apertures therein. It comprises a wall panel support 30 integral with a substantially perpendicular aperture stem 31 which bears extended flexible resilient wings 32 biased in the direction of wall panel support 30. In operation, as aperture stem 31 is inserted into a wall aperture of appropriate size, wings 32 fold in against aperture stem 31. Once aperture stem 31 is fully inserted, wings 32 resiliently return to their extended positions engaging the reverse side of the wall and preventing removal of the affixing device. Clamp stem 33 is appended on one end to flexible band 12 and on its other end to wall panel support 30. The length of clamp stem 33 as well as its flexibility and shape are adapted to conform to the requirements of the intended use of wire bundle clamp 11.

FIGS. 5-8 show an adjustable wire bundle clamp 51 according to the present invention, wherein flexible band 52 defines an enclosure for the containment of workpiece bundles. Flexible band 52 has a natural curvature such that it has an outer band end 53 which overlaps an opposite and inner band end 54. When wire bundle clamp 51 is unlocked, as depicted in FIG. 6, flexible band ends 53 and 54 are separated by arcuate slot 55, through which workpieces can be inserted into the flexible band enclosure. The size of arcuate slot 55 as well as the length and curvature of flexible band 52 are determined by the size and quantity of workpieces intended for insertion into wire bundle clamp 51. Just as with the non-adjustable wire bundle clamp 11, although FIGS. 5-8 depict a flexible band 52 having a generally circular configuration, this invention is considered to encompass any band shape defining an open loop with overlapping ends.

Extending from the inwardly orientated face of outer band end 53 is cylindrical projection 17, appended to outer band end 53 on extension member 19. Cylindrical projection 17 confronts inner band end 54 which has disposed in its resilient surface three cylindrical holes 18, in axial alignment with cylindrical projection 17. Just as with wire bundle clamp 11, annular openings 20 open cylindrical holes 18 to receive cylindrical projection 17, with the dimensions and operation of the various like numbered parts in adjustable wire bundle clamp 51 being the same as previously described for their counterparts in wire bundle clamp 11.

Cylindrical holes 18 are deployed along inner band end 54 so as to define with cylindrical projection 17 different operative lengths of flexible band 52, corresponding to a desired range of wire bundle and flexible band enclosure sizes. Thus by the selection of an appropriate cylindrical hole 18 it is possible to adapt wire bundle clamp 51 to snugly hold any size wire bundle within its contemplated range.

In operation, cylindrical projection 17 and a cylindrical hole 18 corresponding to a desired wire bundle size can be brought into juxtaposed closing alignment by a pinching action deployed to move the overlapping band surfaces laterally one with respect to the other, whereupon the desired alignment having been attained, cylindrical projection 17 can be driven into removable locking engagement with the selected cylindrical hole 18 by pushing or pinching the overlapping band surfaces together. While the locking of wire bundle clamp 51 has been described in two discrete steps, it may also be accomplished with a single continuous pinching action combining the lateral and closing motions just described. The convenient application of pinching forces to flexible band 52 is assisted by finger-grip tab 55 which appends from outer band end 53 on its outwardly disposed surfaces. Further, when wire bundle clamp 51 is locked, as in FIGS. 5 and 8, finger-grip tab 55 defines with the confronting surface of the inner band end 54 a slot 56 which extends to snap-locking members 17 and 18. As with wire bundle clamp 11, a disengaging force may be brought to bear upon the locked snap-locking members 17 and 18 of adjustable wire bundle clamp 51 by means of a finger-nail, screw-driver tip or other object inserted into slot 56.

Wire bundle clamp 51 also includes a device for affixing the clamp to supporting wall panels having aperture therein, the various parts of that device, with the sole exception of clamp stem 33, being in design and operation the same as their like numbered counterparts on wire bundle clamp 11. In FIGS. 5-8, clamp stem 33 has a length and flexibility of design which lends itself to the mounting of wire bundle clamp 51 in close proximity to a supporting wall.

I claim:

1. A wire bundle clamp comprising: a flexible band and a snap-locking means, the complementary component members of which are disposed on the ends of said flexible band; said flexible band having a natural curvature defining a band enclosure and serving to place the complementary component members of said snap-locking means in a juxtaposed alignment which defines therebetween an annular opening for the insertion of axially aligned workpieces, whereby a pinching action imposed on the ends of said flexible band in the proximate area of the complementary component members of said snap-locking means will drive said snap-locking means members along arcuate paths adapted to bring them into touching engagement and locking alignment from which position the application of a sufficient pinching force to overcome the natural resistance of said snap-locking means will drive the complementary component members of the snap-locking means into locking engagement; said flexible band having finger-grip tabs, each said tab extending from the outwardly disposed surface of said flexible band in the proximate location of the snap-locking means component members, whereby a pinching action may be conveniently and easily imposed on said finger-grip tabs, thereby serving to captively drive the complementary component members of said snap-locking means into snap-locking engagement, said finger-grip tabs being aligned and adapted to permit the easy opening of said wire bundle clamp from its locked position by the insertion, between said finger-grip tabs, of an object, sized and configured to exceed at a point along its inserted length, as orientated during insertion or as reorientated subsequent to insertion, the natural separation of said finger-grip tabs on the locked wire bundle clamp, whereby the insertion or reorientation after insertion of said object will impart through said finger-grip tabs a disengaging force upon said snap-locking means, which force will overcome the natural resistance of said snap-locking means causing it to snappingly unlock.

2. The wire bundle clamp of claim 1, wherein the finger-grip tabs are aligned and adapted so that a finger-nail or screw-driver tip can be employed to unlock said snap-locking means.

3. The wire bundle clamp of claim 2, further including a means for affixing said wire bundle clamp to another object, whereby said wire bundle clamp may be used to retain one or more workpieces in a fixed location.

4. The wire bundle clamp according to claim 3, wherein the wire bundle clamp is integrally molded from a plastic dielectric insulating material.

5. The wire bundle clamp according to claim 1, wherein the complementary component members of the snap-locking means are a cylindrical key-like projection and a cylindrical hole, said cylindrical hole being disposed in a mass of resilient material and/or said key-like projection being composed of a resilient material, said cylindrical hole being sized to receive said key-like projection and in axial alignment therewith, said cylindrical hole having an annular opening orientated to receive said key-like projection, said annular opening having a width smaller than the diameter of said key-like projection, whereby the closing of said snap-locking means will cause the key-like projection and the sides of the annular opening to enter into resilient deforming engagement, said deformation continuing until said key-like projection is substantially contained in said cylindrical hole, whereupon the deformed snap-locking means members resiliently return to their natural configurations removably locking the cylindrical key-like projection into the cylindrical hole.

6. A wire bundle clamp, adjustable to snugly hold workpiece bundles of varying sizes comprising: a flexible band and a snap-locking means; said flexible band having a natural curvature such that one outer end of said band overlaps the opposite and inner end of said band establishing a band enclosure and defining between said overlapping flexible band ends an arcuate slot for the insertion into said enclosure of axially aligned workpieces; said snap-locking means having one male and two or more female complementary component members disposed on the confronting overlapping faces of said flexible band so that the male and female complementary component members disposed on the confronting overlapping faces of said flexible band so that the male and female snap-locking means members are placed in near juxtaposed alignment; said female complementary component members being positioned on said flexible band to define with said male member operative band lengths corresponding to different workpiece bundle sizes, whereby the male and a female snap-locking means member defining therebetween a desired bundle size can be brought into juxtaposed locking alignment with a pinching action deployed to move the overlapping band surfaces laterally one with respect to the other, whereupon said snap-locking means can be driven into snap-locking engagement by pushing or pinching the overlapping band surfaces together, thereby moving the selected complementary component members of said snap-locking means first into contact and then, where sufficient force is employed to overcome the natural resistance of said snap-locking means into snap-locking engagement; said flexible band having a finger-grip tab outwardly orientated with respect to the wire bundle clamp enclosure and disposed on the outer end of said flexible band, whereby said finger-grip tab, may be conveniently and easily utilized as a focal point for any laterally aligning or snap-lock means engaging pinching or pushing action, said finger-grip tab being positioned and adapted to define, with the overlapped portion of the flexible band of a locked wire bundle clamp, a slot, whereby said locked wire bundle clamp may be unlocked by the insertion into said slot of an object sized and configured to exceed at a point along its inserted length, as orientated during insertion or as reorientated subsequent to insertion, the width of said slot, whereby the insertion or reorientation after insertion of said object will impart through said finger-grip tab and overlapped flexible band portion a disengaging force upon said snap-locking means, which force will overcome the natural resistance of said snap-locking means causing it to snappingly unlock.

7. The wire bundle clamp of claim 6, wherein the finger-grip tab is aligned and adapted so that a fingernail or screw-driver tip can be employed to unlock said snap-locking means.

8. The wire bundle clamp of claim 6, further including means for affixing said wire bundle clamp to another object, whereby said wire bundle clamp may be used to retain one or more workpieces in a fixed location.

9. The wire bundle clamp of claim 7, further including a means for affixing said wire bundle clamp to another object, whereby said wire bundle clamp may be used to retain one or more workpieces in a fixed location.

10. The wire bundle clamp according to claim 9, wherein the wire bundle clamp is integrally molded from a plastic dielectric insulating material.

11. The wire bundle clamp according to claim 6, wherein the male and female complementary component members of the snap-locking means are respectively a cylindrical key-like projection and a cylindrical hole, said cylindrical hole being disposed in a mass of resilient material and/or said key-like projection being composed of a resilient material, said cylindrical hole being sized to receive said key-like projection and in axial alignment therewith, said cylindrical hole having an annular opening orientated to receive said key-like projection, said annular opening having a width smaller than the diameter of said key-like projection, whereby the closing of said snap-locking means will cause the key-like projection and the sides of the annular opening to enter into resilient deforming engagement, said deformation continuing until said key-like projection is substantially contained in said cylindrical hole, whereupon the deformed snap-locking means members resiliently return to their natural configurations removably locking the cylindrical key-like projection into the cylindrical hole.

* * * * *